United States Patent [19]

Ida

[11] Patent Number: 6,046,894
[45] Date of Patent: Apr. 4, 2000

[54] SEMICONDUCTOR PROTECTION CIRCUIT AND METHOD

[75] Inventor: Richard T. Ida, Phoenix, Ariz.

[73] Assignee: Motorola, Inc., Schaumburg, Ill.

[21] Appl. No.: 09/033,013

[22] Filed: Mar. 2, 1998

[51] Int. Cl.[7] .................................................. H02H 3/22
[52] U.S. Cl. ............................................. 361/56; 361/111
[58] Field of Search ................................. 361/56, 91, 111

[56] References Cited

U.S. PATENT DOCUMENTS

| | | | |
|---|---|---|---|
| 5,671,111 | 9/1997 | Chen ........................................... | 361/56 |
| 5,740,000 | 4/1998 | Stackhouse et al. ...................... | 361/56 |
| 5,781,388 | 7/1998 | Quigley ...................................... | 361/56 |
| 5,825,601 | 10/1998 | Statz et al. ................................. | 361/56 |
| 5,838,146 | 11/1998 | Singer ....................................... | 323/270 |

*Primary Examiner*—Michael J. Sherry
*Attorney, Agent, or Firm*—Anthony M. Martinez

[57] ABSTRACT

A protection circuit (20) protects a semiconductor device (10) from damage due to electrostatic charge transferred to a terminal (19) of the semiconductor device. A voltage follower (26) senses a voltage ($V_{CHARGE}$) developed by the electrostatic charge to produce a follower voltage. A conduction path (30) is enabled with the follower voltage to discharge the electrostatic charge from the terminal before the voltage rises to a magnitude that damages the integrated circuit.

7 Claims, 1 Drawing Sheet

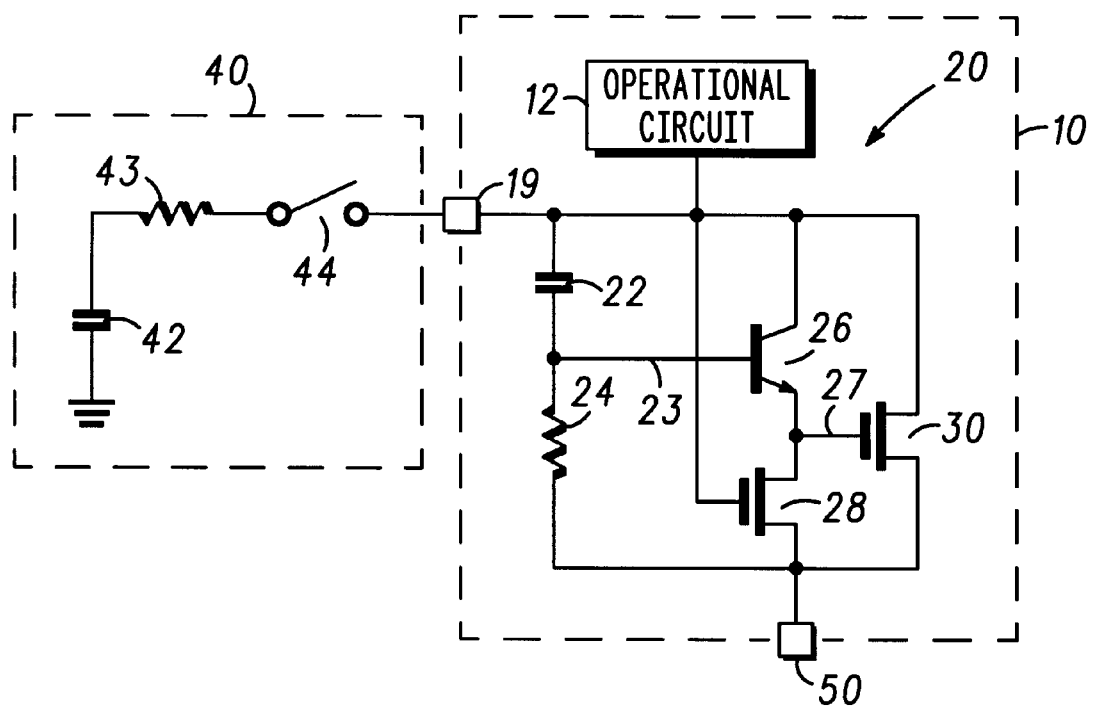

SEMICONDUCTOR PROTECTION CIRCUIT AND METHOD

BACKGROUND OF THE INVENTION

The present invention relates in general to semiconductors and, more particularly, to protection circuits for semiconductor devices.

Semiconductor manufacturers are fabricating integrated circuits whose small surface features allow several million transistors to be integrated on a semiconductor die less than one centimeter on a side. These small transistors are highly susceptible to damage from environmental factors such as electrostatic charges. For example, a human body can accumulate enough charge to develop several thousand volts of potential which can permanently damage an integrated circuit. When otherwise functional devices are rendered inoperable due to damage, the effective manufacturing cost increases. The cost is particularly high when the damage occurs late in the fabrication cycle.

To avoid device damage from an electrostatic charge, integrated circuits often include protection circuits to remove the charge before it reaches a damaging voltage level. Prior art protection circuits use large resistors and capacitors to establish a long time constant that maintains the protection circuit in an active state until all of the charge has been removed. However, these large resistors and capacitors occupy a substantial die area, which increases the die size and manufacturing cost of the integrated circuit.

Hence, there is a need for a more economical circuit and method for protecting a semiconductor device from damage due to high voltage developed by an electrostatic charge applied to the device.

BRIEF DESCRIPTION OF THE DRAWING

The sole FIGURE schematically illustrates an integrated circuit including a semiconductor protection circuit in accordance with the present invention.

DETAILED DESCRIPTION OF THE DRAWING

The sole FIGURE illustrates an integrated circuit 10 having an external terminal 19 coupled to a human body model (HBM) network 40. Integrated circuit 10 includes an operational circuit 12 and a protection circuit 20 that operates to protect operational circuit 12 from damage due to electrostatic discharge. Integrated circuit 10 is fabricated on a process which can integrate both bipolar and metal-oxide-semiconductor (MOS) transistors on the same semiconductor die. The principles of the present invention are not limited to such a process, but can equally be applied to other processes as well.

To better appreciate the behavior of an electrostatic charge, HBM network 40 is shown to represent an equivalent circuit of a human body. HBM network 40 is a standard model used by semiconductor manufacturers to simulate the behavior of an electrostatically charged human body. HBM network 40 is used to test semiconductor devices and to evaluate their resistance to electrostatic damage. A high degree of correlation has been found between the damage resistance of devices subjected to a charge supplied by HBM 40 and those coming into contact with an electrostatically charged human body.

HBM network 40 includes a one hundred picofarad capacitor 42, a two kilohm resistor 43 and a switch 44. Capacitor 42 represents the charge storage capability of a human body and resistor 43 represents its equivalent resistance when the charge is transferred. The open position of switch 44 represents a human body isolated from terminal 19 and the closed position represents the human body in contact with terminal 19.

Initially, capacitor 42 is charged to a specified value such as two thousand volts while switch 44 is open, representing a charge accumulated by an isolated human body. When switch 44 closes, the charge on capacitor 42 flows through resistor 43 to terminal 19 of integrated circuit 10 to develop a positive voltage $V_{CHARGE}$. $V_{CHARGE}$ has a short rise time and long decay time. For example, $V_{CHARGE}$ can reach its peak voltage level in less than ten nanoseconds and then decay back to its original level over a period of about five hundred nanoseconds. If the electrostatic charge is not quickly removed, $V_{CHARGE}$ can develop a high potential on terminal 19 which is sufficient to damage integrated circuit 10. Therefore, to avoid damage to integrated circuit 10, as much as (2,000 volts/1.5 kilohms)=1.3 amperes of current is needed to discharge terminal 19 before high voltages can develop.

Operational circuit 12 performs a specified function of integrated circuit 10. To perform that function, operational circuit 12 is coupled to terminal 19 either to receive a digital or analog input signal or power supply voltage or to provide a digital or analog signal such as an output signal. To simplify the description, the specified signal or power supply voltage on terminal 19 is designated herein as an operating signal.

There is a maximum voltage on terminal 19 to which operational circuit 12 can be subjected without incurring damage. A voltage in excess of this amount can stress integrated circuit 10 and cause permanent damage. This maximum voltage is designated herein as the stress voltage of integrated circuit 10, and refers to the voltage level above which the device can sustain short or long term damage or reduced reliability. For example, the stress voltage of a metal-oxide-semiconductor (MOS) transistor may be set by the maximum voltage that can be applied across the gate oxide of the transistor. If the stress voltage is exceeded, the gate oxide can rupture and permanently damage the transistor. If the gate potential is maintained below the stress voltage, damage will not occur. If a voltage over fifteen volts can damage integrated circuit 10, its stress voltage is fifteen volts.

It should be noted that other damage mechanisms besides ruptured gate oxides are known and have been quantified to determine a device's stress voltage. Moreover, voltages above a device's stress voltage need not result in an immediate failure of the device. Such a voltage may weaken the device and result in a failure at a later time, which effectively reduces the device's reliability. Device damage can be avoided when circuit voltages are maintained at magnitudes less than the stress voltage.

Protection circuit 20 is coupled to terminal 19 to protect operational circuit 12 by removing electrostatic charge before $V_{CHARGE}$ can rise to a value above the stress voltage and damage integrated circuit 10. When an electrostatic charge is not present, protection circuit 20 monitors terminal 19 in an inactive or standby mode. Because of its standby operation, protection circuit 20 can be used effectively to protect virtually any type of terminal of a semiconductor device such as an integrated circuit.

When electrostatic charge is transferred to terminal 19, protection circuit 20 is activated by the short $V_{CHARGE}$ rise time. Protection circuit 20 does not respond to operating signals since the rise times of these voltages are slower.

Protection circuit 20 is coupled between terminal 19 and a ground terminal 50, and includes a capacitor 22, a resistor 24, and transistors 26, 28 and 30.

Protection circuit 20 uses a high pass filter to discriminate between the short $V_{CHARGE}$ rise time and that of the operating signals. The filter time constant is formed with capacitor 22 and resistor 24, which are coupled to a common node 23 to pass $V_{CHARGE}$ and reject operating signals. For example, the rising edge of $V_{CHARGE}$ can be approximated by equation (1) as follows.

$$\frac{V_{CHARGE}}{t_{RISE}} = \frac{2000 \text{ v}}{10 \text{ ns}} = 200 \text{ v/ns} \tag{1}$$

In contrast, operating signals typically have magnitudes of five volts and rise and fall times exceeding several nanoseconds. For example, a typical power supply voltage $V_{SUPPLY}$ applied to terminal 19 has a rise time greater than one microsecond. Hence, the operation of $V_{SUPPLY}$ is approximated by equation (2) as follows.

$$\frac{V_{SUPPLY}}{t_{RISE}} = \frac{5.0 \text{ v}}{1.0 \text{ }\mu\text{s}} = 5.0 \text{ v/}\mu\text{s} \tag{2}$$

In the described embodiment, the time constant of capacitor 22 and resistor 24 is set to ten nanoseconds, which allows the rising edge of $V_{CHARGE}$ to pass while blocking the rising edge of $V_{SUPPLY}$. In this example, capacitor 22 has a capacitance of one picofarad and resistor 24 has a resistance of ten kilohms. Such values are readily implemented in a small die area and do not require a modification of the manufacturing process. Hence, protection circuit 20 adds little or no cost to the fabrication of integrated circuit 10, especially when compared to prior art protection circuits using physically large resistors and capacitors to produce time constants that can exceed five hundred nanoseconds.

Transistors and other semiconductor devices used in protection circuit 20 are understood to provide a conduction path between first and second conduction electrodes when a control signal is applied to a control electrode. For example, the first and second conduction electrodes correspond to the collector and emitter of a bipolar transistor, and the control electrode corresponds to the base. For an MOS transistor, the first and second conduction electrodes correspond to the drain and source and the control electrode corresponds to the gate.

Transistor 26 is operated as a voltage follower. Transistor 26 is shown as an NPN bipolar transistor configured as an emitter follower whose base electrode or input is coupled to the high pass filter at node 23 and whose emitter electrode or output provides a follower voltage at a node 27. Alternatively, transistor 26 can be another type of device that performs a voltage follower function. For example, transistor 26 can be implemented as an MOS transistor operating as a source follower. Transistor 26 is configured to conduct fifty milliamperes to charge the capacitance on node 27 with little or no delay so that the follower voltage closely tracks the voltage on node 23. Transistor 26 has an emitter area of one hundred square microns in order to provide the fifty milliamperes of current.

Transistor 30 is an MOS transistor that provides a conduction path for discharging the electrostatic charge to ground terminal 50. Transistor 30 is sized so that the resistance of the conduction path is less than five ohms to provide at least 1.3 amperes of peak current for discharging the electrostatic charge while limiting $V_{CHARGE}$ to a magnitude less than the stress voltage. Transistor 30 has a channel length of 0.8 microns, a channel width of two thousand microns and a gate capacitance of about two picofarads in order to ensure the conduction path does not exceed five ohms of resistance.

Transistor 28 supplies emitter bias current to transistor 26 and provides a discharge path for the gate capacitance of transistor 30 to turn off transistor 30. The discharge path desensitizes the gate of transistor 30 to stray charges that could otherwise inadvertently turn on transistor 30. Consequently, transistor 30 is maintained in an inactive state that does not significantly load terminal 19 when an electrostatic charge is not present. The current through transistor 28 is less than five microamperes to minimize current drain. Transistor 28 has a channel length of sixty microns and a channel width of 1.6 microns to provide the five microampere current.

The operation of protection circuit 20 is as follows. In the inactive mode, node 23 is at ground potential and transistors 26 and 30 are turned off. Transistor 28 is turned off but may be turned on to the extent necessary to discharge the gate capacitance to maintain transistor 30 in an inactive or off condition. Hence, protection circuit 20 produces little or no loading on terminal 19 and operational circuit 12 functions in its specified manner.

When an electrostatic charge is transferred to terminal 19, $V_{CHARGE}$ rapidly increases to a peak value in less than ten nanoseconds. The voltage increase is coupled through capacitor 22 and sensed at the input of transistor 26 to rapidly turn on transistor 26. Transistor 30 is turned on to route the electrostatic charge to ground conductor 50 to maintain $V_{CHARGE}$ at a magnitude less than the stress voltage.

Since $V_{CHARGE}$ decays more slowly than it rises, a decaying current flows through capacitor 22 and resistor 24 which decreases the potential at node 23. As node 23 decays to about 1.5 volts, transistor 26 turns off. However, transistor 28 remains turned on to conduct a small current that slowly discharges the transistor 30 gate capacitance. The slow discharge keeps transistor 30 turned on for a prolonged period of five hundred nanoseconds to ensure that practically all of the electrostatic charge is removed from terminal 19. This prolonged period resulting from the slow discharge of the transistor 30 gate capacitance represents about fifty time constants formed by capacitor 22 and resistor 24 of protection circuit 20. When $V_{CHARGE}$ decays below the gate-to-source conduction voltage of transistor 28, or about eight hundred millivolts, transistor 28 turns off. However, transistor 30 remains on and continues to discharge the electrostatic charge until the charge has been fully depleted. At that point, transistor 30 turns off to return protection circuit 20 to the inactive state.

Hence, the present invention provides a protection circuit that protects a semiconductor device from damage due to electrostatic charge. A voltage follower senses a voltage developed by an electrostatic charge at a terminal of the semiconductor device and produces a follower voltage. A conduction path is enabled with the follower voltage to discharge the electrostatic charge to limit the terminal voltage to a magnitude less than the stress voltage of the semiconductor device. By sensing the terminal voltage with a voltage follower, the protection circuit can utilize a filter with a short time constant to select between operating signals and signals resulting from electrostatic charges while prolonging the discharge of the terminal for a period well in excess of the time constant. The short time constant is implemented with components which are physically smaller than those of prior art protection circuits, and therefore occupy less die area to reduce the cost of the semiconductor device.

What is claimed is:

1. An integrated circuit, comprising:
   a voltage follower having an input coupled to a first terminal of the integrated circuit for sensing a first voltage produced by an electrostatic charge;
   a conduction path having a control electrode coupled to an output of the voltage follower for enabling the conduction path, and a first conduction electrode coupled to the first terminal, and a second conduction electrode coupled to a power supply terminal;
   a capacitor coupled between the first terminal and the input of the voltage follower;
   a resistor coupled between the input of the voltage follower and the power supply terminal; and
   a first transistor having a first conduction electrode coupled to the control electrode of the conduction path, a second conduction electrode coupled to the power supply terminal, and a control electrode coupled to the first terminal.

2. The integrated circuit of claim 1, wherein the voltage follower includes a bipolar transistor having a base and an emitter coupled to the input and output of the voltage follower, respectively.

3. The integrated circuit of claim 2, wherein a collector of the bipolar transistor is coupled to the first terminal.

4. A protection circuit for a semiconductor device, comprising:
   a capacitor having a first terminal coupled to an input terminal of the semiconductor device;
   a voltage follower having an input coupled to a second terminal of the capacitor;
   a transistor having a control electrode coupled to the first terminal of the capacitor, a first conduction electrode coupled to an output of the voltage follower, and a second conduction electrode coupled to a power supply terminal of the semiconductor device; and
   a conduction path having a control electrode coupled to the output of the voltage follower, a first conduction electrode coupled to the first terminal of the capacitor, and a second conduction electrode coupled to the power supply terminal.

5. The protection circuit of claim 4, wherein the conduction path includes a first transistor having a control electrode coupled to the output of the voltage follower, a first conduction electrode coupled to the first terminal of the capacitor, and a second conduction electrode coupled to the power supply terminal.

6. The protection circuit of claim 4, wherein the voltage follower includes a bipolar transistor having a base and an emitter coupled to the input and output of the voltage follower, respectively, and a collector coupled to the first terminal of the capacitor.

7. The integrated circuit of claim 4, further comprising a resistor coupled between the input of the voltage follower and the power supply terminal.

* * * * *